Sept. 3, 1935.  H. JUNKERS  2,012,998

FUEL FEED FOR INTERNAL COMBUSTION ENGINES

Original Filed Nov. 25, 1927

Inventor:
Hugo Junkers
by Karth...
atty.

Patented Sept. 3, 1935

2,012,998

UNITED STATES PATENT OFFICE 2,012,998

FUEL FEED FOR INTERNAL COMBUSTION ENGINES

Hugo Junkers, Dessau, Germany

Original application November 25, 1927, Serial No. 235,703, now Patent No. 1,868,636, dated July 26, 1932. Divided and this application April 10, 1930, Serial No. 443,183. In Germany March 10, 1927

6 Claims. (Cl. 123—140)

My invention relates to internal combustion engines and more especially to engines equipped with means for varying the fuel supply and with regulating means for automatically influencing the varying means in such manner that the engine will operate at a predetermined speed, as described in my copending application for patent of the United States, Serial No. 235,703, filed November 25, 1927, now Patent No. 1,868,636 dated July 26, 1932, of which this application is a division.

As explained in this copending application, means are provided for influencing a regulator to adjust it for a different speed, and a member is connected with the regulator which is adapted to counteract the force acting on the movable part of the regulator.

Any governor must regulate the speed of its engine in such manner that the speed is lower for full load than for no load. The maximum speed minus the minimum speed, divided by the medium speed, is known as the permanent variation. The permanent variation is obviously the higher, the larger the difference of the maximum and minimum speeds is, as compared with the medium speed.

If the permanent variation is high the range from maximum to minimum speed is high but the regulation is "soft", i. e., the change from a given amount of fuel supply to another in consequence of a change of the load on the engine, and the corresponding variation of the speed is not abrupt but gradual. A low permanent variation, on the other hand, results in a smaller range of speeds but the regulation is more abrupt because small speed variations cause large strokes of the governor and correspondingly large variations of the energy supply to the engine.

It is an object of the present invention to obtain gradual speeding-up at lower speeds, for at these speeds only an abrupt acceleration is felt as an unpleasant jerk. To this end I provide means which are positively connected with the means for adjusting the regulator and are so designed that they vary the permanent variation inversely with the speed, adjusting the regulator for a higher permanent variation at lower speeds and for a lower permanent variation at higher speeds.

Engines of the kind described, with the speed variable within wide limits, are principally used for the propulsion of vehicles. In such engines it has already been suggested to provide an automatic regulator for the speed which is adapted to control the fuel measuring pump and to be adjusted for various speeds of the engine.

Such regulators as heretofore designed involve the drawback that when set for a higher speed they adjust the fuel pump immediately for maximum delivery and then regulate it back to the delivery corresponding to the new speed. This over-regulation is particularly undesirable in vehicle engines, as the engine is speeded up quite abruptly and unpleasant jerking is brought about.

According to my invention jerking when speeded up is avoided and the change from lower to higher speed is gradual and imperceptible. This is effected in the manner described by varying the permanent variation of the regulator inversely with the speed. A regulator with a high permanent variation regulates gradually, as a given variation of the speed causes a smaller variation of the fuel delivery than with a regulator of higher permanent variation, and thus jerking is avoided.

Various means may be provided for varying the permanent variation of the regulator, for instance, a spring may be provided with one of its ends attached to a lever transmitting its tension to the part of the regulator which is influenced by a change of the speed, while its other end is adapted to be displaced in such manner that in the neutral position of the movable regulator part the torque exerted on the part by the spring (being the product of spring tension and leverage) is substantially constant for all positions of the movably end of the spring. For varying the permanent variation of the regulator the free end of the spring is displaced and the mechanism for displacing it is connected to the means for adjusting the regulator, as follows: When the regulator is adjusted for a low speed the spring is substantially at right angles to the lever when the lever is in its central position. The torque produced by the force of the spring at the axis of the lever is about proportional to the variation of the force of the spring and consequently the force can vary within comparatively wide limits. The force exerted by the regulator must balance this torque and as the torque, as mentioned, varies within such wide limits, the force exerted by the regulator must also vary within wide limits, and this requires that the speed of the engine should also vary for the correspondingly high values.

The means for displacing the other end of the spring and for adjusting the regulator for various speeds, are so connected that the position of the spring in which it is at right angles to the lever, as mentioned above, corresponds to the adjusting of the regulator for low speed. When the regulator is adjusted for high speeds the other end of the spring is displaced in such manner that in the central position of the lever engaged by the spring the spring is at an acute angle to the lever. In this position, the torque which the spring produces at the axis of the lever, varies by smaller amounts for equal strokes of the lever than in the case in which the spring is substantially at right angles to the lever. In conformity with this, the speeds required for balancing the torque produced by the spring in one or the other final position of the lever, differ by a much smaller value than in the case of substantially rectangular relative position of the spring and lever.

It will be understood that by providing such an additional spring at the regulator, the desired operation of the regulator is attained, i. e. the permanent variation is high at lower and small at higher speeds.

Any kind of regulator or governor may be provided but the design becomes particularly simple if the regulator is designed so as to be influenced by the variations of the suction at a throttling point in the air-supply pipe to the engine when the speed of the engine varies. The suction is varied at a throttling point in the suction pipe, for instance, by a normal throttle valve. A regulator or governor of the last-mentioned type is equipped with a piston or plate which reciprocates or oscillates in a casing. The casing is connected to the atmosphere at one side of the piston and to the suction pipe at the rear of the throttling station or throttling valve at the other side of the piston, so that the piston is controlled by atmospheric pressure acting on one of its faces and by the suction in the suction pipe of the engine at the rear of the throttling point on its other face. This pressure is balanced by the spring referred to. The lever to which one end of the spring is attached as described, is operatively connected to the piston and the other end of the spring is adapted to be displaced in the manner described when the speed of the engine is varied.

The piston regulates the fuel supply to the engine in cooperation with the spring, the spring tending to increase the amount of fuel supplied to the engine per stroke.

The free sectional area of the throttling point is variable. If the free sectional area is small, i. e. the throttling action is intense, a considerable reduction of pressure is effected already at a comparatively low speed of the engine and therefore the engine speed required for balancing a definite tension of the spring is comparatively low. A small sectional area at the throttling point consequently is equivalent to regulation of the engine for low speed. When the throttle valve is opened wide, the engine must run very fast in order to produce the same reduction of pressure, or the same suction, at the rear of the throttling point which was produced by the slowly running engine with the small sectional area laid open by the throttle valve, since in order to effect the same reduction of pressure as for the slowly running engine, a huge amount of air must flow past the wide-open throttling point per unit of time. The wide open position of the throttle valve consequently corresponds to high speed of the engine.

A regulator or governor having a piston of the kind referred to is adjusted for various engine speeds by the simple expedient of adjusting the throttle valve.

In order to obtain a substantially higher permanent variation for the lower ranges of speed than for the higher ranges, the throttle valve is connected to the other end of the spring, i. e. to the end which is not attached to the lever referred to, in such manner that the position of its other end which effects a great variation of the torque exerted by the spring, corresponds to a small free sectional area at the throttling station, and the position of the other end of the spring which causes a small variation of the torque exerted by the spring, corresponds to the wide open position of the throttle valve. In the first case, with a small free sectional area laid open at the throttle valve and at low speed, considerable variation of the speed is required for balancing the tension of the spring in the final positions of the regulator and therefore the permanent variation is high under these conditions. In the second case, with the throttle valve wide open and at high speed, the variation of the speed required for balancing the tension of the spring in the final positions of the regulator is much less so that the permanent variation is much smaller in the second case.

In the drawing affixed to this specification and forming part thereof a two-cycle engine equipped with the mechanism for varying the permanent variation of the regulator is illustrated diagrammatically and partly in section by way of example, it being understood that the mechanism may also be adapted to a four-cycle engine if desired, with a diagram showing its operation.

In the drawing

Figure 1:
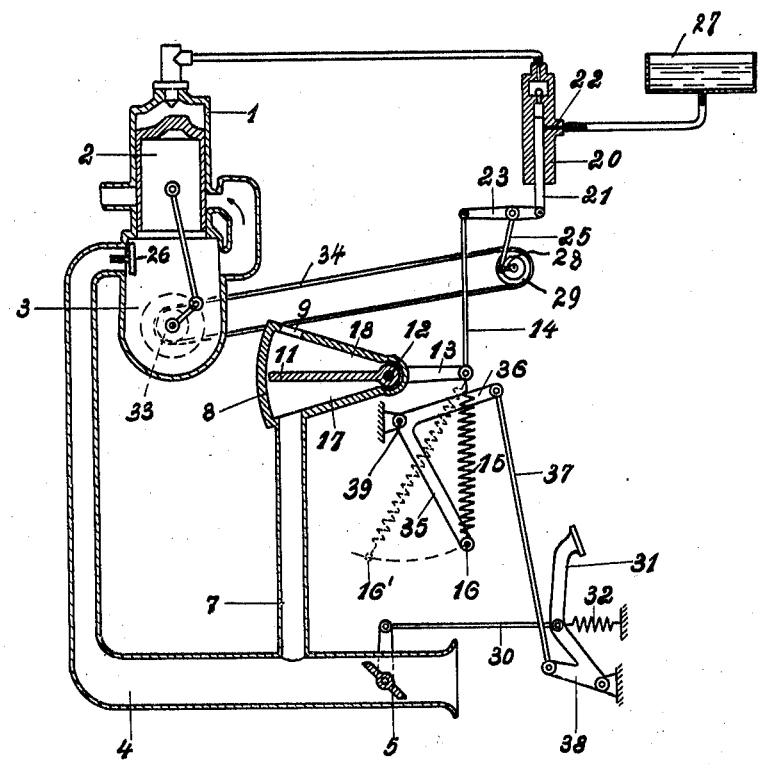
Fig. 1 is the sectional elevation of the engine.

Referring now to Fig. 1, 1 is a two-cycle engine with a piston 2, and a crank case 3 serving as the scavenging pump, 4 is the air-intake pipe of the scavenging pump 3, 26 is a check valve at the point where the pipe 4 opens into the crank case 3, 5 is a throttle in the intake pipe 4, and 30 is a rod connecting a lever on the throttle with the accelerator, or any other contrivance, which is here shown as a pedal 31 with a pull-back spring 32.

By way of example, a regulator is illustrated which is influenced by the pressure in the intake pipe 4. A casing 8 is arranged at a suitable point intermediate the throttle 5 and the piston 2 of the engine 1, and connected with the intake pipe 4 by a pipe 7. 11 is the movable part of the regulator, in the present instance a vane or oscillating piston pivoted in the casing 8 at 12 to rock therein with as small a circumferential clearance as possible. The casing 8 is subdivided into two chambers 17 and 18 by the piston 11, the chamber 17 being connected with the pipe 7, and the chamber 18 being connected to the atmosphere by an opening 9.

13 is a lever which is secured on the pivot 12 outside the casing 8, 14 is a connecting rod at the end of the lever 13, 23 is a double-armed lever which is linked to the free end of the rod 14 and at its other end is linked to the piston 21 of a fuel pump 20. 22 is a passage in the wall of the pump cylinder 20, and 27 is a fuel tank connected with the passage. The double-armed lever 23 is fulcrumed about the end of a rod 25 to which rod reciprocation is imparted through the medium of a crank 28 on a pulley or sprocket 29 which is actuated from a pulley or sprocket 33 on the crank shaft of the engine through the medium of a belt or chain 34. 15 is a spring which is attached to the end of the lever 13 at one end and to a bell-crank lever 35, 36 at its other end 16. The bell-crank lever is fulcrumed at 39 and is connected with an arm 38 on the accelerator 31 through the medium of a rod 37.

It will be understood that the delivery of the pump 20 is varied by displacing the rod 14 so that the time at which the piston 21 closes the opening 22 is advanced or retarded, varying the effective stroke of the pump and the delivery of fuel to the engine.

The operation of my mechanism is as follows:

The spring 15 corresponds to the spring which is provided in centrifugal governors for counteracting the centrifugal force, and the oscillation of the piston 11 corresponds to the oscillation of the fly weights in a centrifugal governor. The force acting on the piston 11 is variable with the vacuum in the suction pipe 4, and the speed of the engine is determined by the conditions of equilibrium between the force and the reaction of the spring 15. Whenever the force and the reaction are in equilibrium the engine runs at a predetermined speed until the equilibrium is disturbed by a variation either of the force or of the reaction, and the engine will run at another speed at which equilibrium under the new conditions will be re-established.

Figure 2:
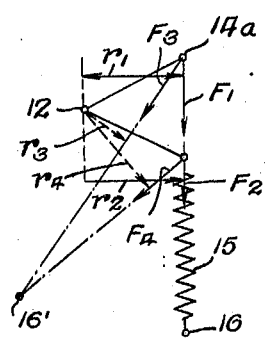
Fig. 2 is the diagram.

Assuming now that the free sectional area of the suction pipe 4 which is laid open by the throttle 5 is small, i. e., the engine to be regulated for a low speed range, say, 300 to 800 revolutions per minute at low load, the movable member or piston 11 descends. The free end of lever 13 rises to 14a (Fig. 2). The lower end of spring 15 is at 16, the tension of spring 15 is $F_1$ and its effective arm is $r_1$. At higher load the movable member 11 rises, the free end of lever 13 descends to 14b, the lower end of spring 15 remains at 16, the tension of spring 15 is $F_2$ and its effective arm is $r_2$. In the two final positions illustrated in the drawing the effective arms $r_1$ and $r_2$ are equal.

When the engine is regulated for a higher speed range, say, 1450 to 1600 revolutions per minute, the free sectional area laid open by the throttle 5 is larger and the lower end of spring 15 is displaced to 16' by the means described. At low load, with the upper end of the spring at 14a, the tension of the spring is $F_3$ and its effective arm is $r_3$. At higher load, with the upper end of the spring 15 at 14b, its tension is $F_4$ and its effective arm is $r_4$.

The mechanism for varying the tension of spring 15 and its effective arm is so designed according to my invention that the difference of the torques $F_1$, $r_1$ and $F_2$, $r_2$ for the lower speed range is greater than the difference $F_3$, $r_3$ and $F_4$, $r_4$, for the higher speed range, but that the medium value of the two first-mentioned torques $F_1$, $r_1$ and $F_2$, $r_2$ is equal, or substantially equal, to the medium value of the two last-mentioned torques $F_3$, $r_3$ and $F_4$, $r_4$. If the difference of the torques is great, as is the case for the lower speed range in the present instance, the variation of the speed which corresponds to a given variation of the engine load, is considerable, and this means a high permanent variation. On the other hand, if the difference of the torques is small, as is the case for the higher speed range, the variation of the speed with the load is not as considerable as in the lower speed range, and this means a low permanent variation and "soft" regulation.

Under full load at 300 revs. per min., the permanent variation is very high, being equal to $$\frac{800-300}{550}=.9$$

For high speeds, the throttle valve 5 is opened wide by the pedal 31 and the end 16 of bell-crank lever 35, 36 to which the lower end of the spring 15 is connected, is displaced to 16' by the connection 37, 38 of the bell-crank lever and the pedal 31, so that the axis of the spring 15 is now at an acute angle to the central position x—x of the piston 11, its leverage is less than $r_1$ in Fig. 2, and the torque of the spring 15 related to the pivot 12 is reduced. The resultant force acting on the piston 11 from above is less and so is the torque it exerts at the pivot 12 against the, also weaker, torque of the spring 15. Therefore, the weaker vacuum holds the piston 11 down and the supply of fuel is a minimum. In order, however, to keep up this vacuum in the suction pipe 4 notwithstanding the wide-open throttle valve 5, the engine must run faster.

When the engine is now loaded with full load, it slows down and the vacuum is reduced. The fuel supply is regulated for full load and when equilibrium has been established, the engine runs at the lowest speed of the high range, i. e., 1450 revs. per min. The permanent variation is very low, being equal to $$\frac{1600-1450}{1525}=.098$$

It will appear that the permanent variation is high for the low, and low for the high speed range, as required.

While I have described my mechanism in connection with a suction-controlled regulator I do not desire to be limited to this particular type of regulator as regulators of any type including centrifugal regulators may be provided without departing from my invention.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. In an internal combustion engine in combination, means for supplying fuel to the engine, and means for varying the fuel supply to the engine, a movable member whose position is varied as the speed of the engine varies, and which is operatively connected to said supply-varying means, a resilient member which is operatively connected to both said movable member and to said supply-varying means, and is so arranged with respect to the supply-varying means that its force tends to increase the supply of fuel, a control for varying the speed range of the engine, and mechanism operatively connected to said control for varying the reaction of said resilient member on said movable member, said mechanism being so designed that the difference of the forces exerted on said movable member by said resilient member at full and at no load is greater for lower than for higher speed ranges.

2. In an internal combustion engine in combination, means for supplying fuel to the engine, and means for varying the fuel supply to the engine, a movable member whose position is varied as the speed of the engine varies, and which is operatively connected to said supply-varying means, a spring which is attached to both said movable member and to said supply-varying means with one of its ends, and is so arranged with respect to the supply-varying means that its force tends to increase the supply of fuel, a control for varying the speed of the engine, and mechanism operatively connected to said control to which mechanism the other end of said spring is attached, for varying the position of the other end of said spring, said mechanism being so designed that the difference of the forces exerted on said movable member by said resilient member at full and at no load is greater for lower than for higher speeds.

3. In an internal combustion engine in combination, means for supplying fuel to the engine, and means for varying the fuel supply to the engine, a movable member whose position is varied as the speed of the engine varies, and which is operatively connected to said supply-varying means, a control for varying the speed of the engine, a lever which is mounted to oscillate about a fixed pivot and is operatively connected to said movable member, a spring which is attached to said lever at one end and is so arranged with respect to said supply-varying means that its force tends to increase the supply of fuel, and mechanism operatively connected to said control for displacing the other end of said spring, said mechanism being so designed that the difference of the forces exerted by said spring at full and at no load is greater for lower than for higher speeds.

4. In an internal combustion engine, a suction pipe, means for throttling said suction pipe, a casing connected to said suction pipe at a point at the rear of said throttling means, a movable member in said casing whose position is varied as the speed of the engine varies, means for supplying fuel to the engine, means for varying the fuel supply, means for connecting said movable member to said supply-varying means, a resilient member which is operatively connected to both said movable member and to said supply-varying means, and is so arranged with respect to the last-mentioned means that its force tends to increase the supply of fuel, and mechanism operatively connected to said throttling means for varying the reaction of said resilient member on said movable member, said mechanism being so designed that the difference of the forces exerted on said movable member by said resilient member at full and at no load is greater when said throttling means cuts off a larger section of said suction pipe, than if it cuts off a smaller section.

5. In an internal combustion engine, a suction pipe, means for throttling said suction pipe, a casing connected to said suction pipe at a point at the rear of said throttling means, a movable member fulcrumed in said casing, means for supplying fuel to the engine, means for varying the fuel supply, a lever on said movable member operatively connected to said fuel varying means, a spring which is attached to said lever at one end and is so arranged with respect to said lever that its force tends to increase the supply of fuel, and mechanism operatively connected to said throttling means for varying the reaction of said spring on said lever, said mechanism being so designed that the difference of the torques exerted on said movable member by said spring at full and at no load is greater when said throttling means cuts off a larger section of said suction pipe, than if it cuts off a smaller section.

6. In an internal combustion engine, a suction pipe, means for throttling said suction pipe, a casing connected to said suction pipe at a point at the rear of said throttling means, a movable member fulcrumed in said casing, means for supplying fuel to the engine, means for varying the fuel supply, a lever on said movable member operatively connected to said fuel varying means, a spring which is attached to said lever at one end and is so arranged with respect to said lever that its force tends to increase the supply of fuel, and an oscillating lever to which the other end of said spring is attached, said oscillating lever being connected to said throttling means in such manner that the difference of the torques exerted on said movable member by said spring at full and at no load is greater when said throttling means cuts off a larger section of said suction pipe, than if it cuts off a smaller section.

HUGO JUNKERS.